United States Patent
Sudo et al.

[11] Patent Number: 6,069,924
[45] Date of Patent: May 30, 2000

[54] DIFFERENTIAL DETECTOR WITH ERROR CORRECTING FUNCTION

[75] Inventors: Hiroaki Sudo; Katsuhiko Hiramatsu; Mitsuru Uesugi, all of Yokohama, Japan

[73] Assignee: Matsushita Electric Industrial Co., Ltd., Osaka, Japan

[21] Appl. No.: 09/027,510

[22] Filed: Feb. 20, 1998

[30] Foreign Application Priority Data

Feb. 21, 1997 [JP] Japan ................................. 9-052514

[51] Int. Cl.⁷ .................................................. H04L 27/22
[52] U.S. Cl. ........................................... 375/330; 329/300
[58] Field of Search .................................. 375/279, 329, 375/283, 330; 329/300

[56] References Cited

U.S. PATENT DOCUMENTS

| | | | |
|---|---|---|---|
| 5,241,567 | 8/1993 | Shimakata | 375/332 |
| 5,440,265 | 8/1995 | Cochran et al. | 239/300 |
| 5,461,646 | 10/1995 | Klomars | 375/267 |

FOREIGN PATENT DOCUMENTS 54-8908  1/1979  Japan .

*Primary Examiner*—Tesfaldet Bocure
*Attorney, Agent, or Firm*—Stevens, Davis, Miller & Mosher, L.L.P.

[57] ABSTRACT

A differential detector imparted with error correcting function for detecting a differentially phase shifted signal while performing error correction includes a one-symbol differential detector for performing phase comparison between a current input signal and a signal preceding by one symbol, a delay circuit for delaying a one-symbol differential detection signal by two symbol periods, a two-symbol differential detector for performing phase comparison between the current input signal and an input signal preceding by two symbol periods, a four-symbol differential detector for performing phase comparison between the current input signal and an input signal preceding by four symbol periods, and two error correction circuits. By making use of the four-symbol differential detection signal, error correction of the two-symbol differential detection signal is performed by the error correction circuit while error correction of the one-symbol differential detection signal is performed by using the corrected two-symbol differential detection signal. By diminishing the error of the two-symbol differential detection signal, the error correcting capability for the one-symbol differential detection signal is enhanced with bit error rate characteristic being improved.

7 Claims, 9 Drawing Sheets

DIFFERENTIAL DETECTOR WITH ERROR CORRECTING FUNCTION

BACKGROUND OF THE INVENTION

1. Field of the Invention

The present invention relates generally to a differential detector imparted with an error correcting function, which detector is employed in a radio receiver of a digital mobile communication system for demodulating a differential phase modulated or shifted signal. More particularly, the present invention is concerned with a differential detector with the error correcting function for correcting a two-symbol differential detection signal by making use of a four-symbol differential detection signal and then correcting a one-symbol differential detection signal by utilizing the corrected two-symbol differential detection signal.

2. Description of Related Art

In digital mobile communication such as a digital cellular mobile phone system, there is used a differential phase-shifted signal such as a signal which has undergone π/4-DQPSK (π/4 differential quadrature phase shift keying) or the like. The differential phase-shifted signal can be detected by a synchronous detector or a differential detector. Although the circuit configuration of the differential detector is relatively simple, the differential detector suffers a higher bit error rate when compared with the synchronous detector. Under the circumstances, the differential detector with error correcting function is employed with a view to reducing the bit error rate.

Figure 8:
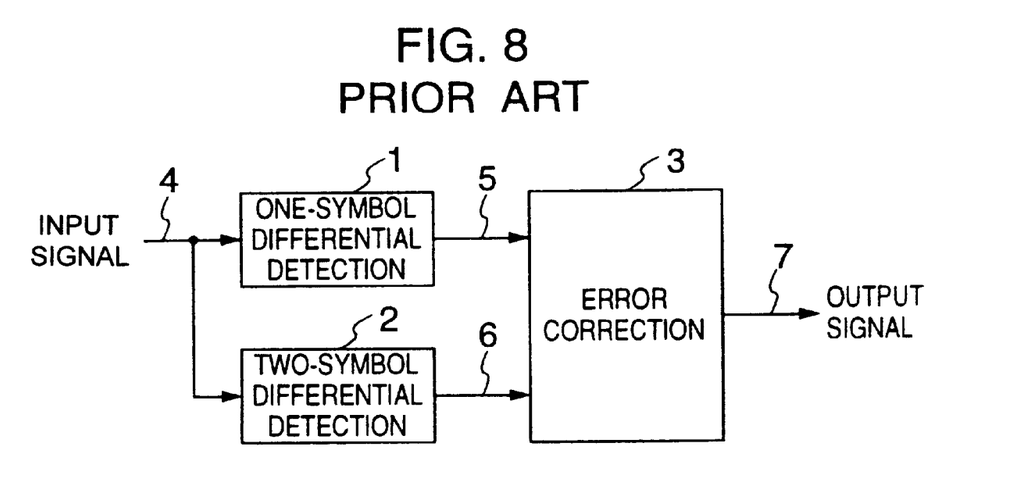
FIG. 8 is a functional block diagram showing schematically a structure of a conventional differential detector equipped with error correcting function.

For having better understanding of the concept underlying the present invention, description will first be made of a conventional differential detector with error correcting function. FIG. 8 of the accompanying drawings is a functional block diagram showing schematically a structure of a conventional differential detector with error correcting function. Referring to FIG. 8, a reference numeral 1 denotes a one-symbol differential detection circuit for performing phase comparison between a current input signal and an input signal preceding by one symbol relative to the current input signal to thereby output a phase difference signal, numeral 2 denotes a two-symbol differential detection circuit for performing phase comparison between a current input signal and an input signal preceding by two symbols relative to the current input signal to thereby output a phase difference signal, and numeral 3 denotes an error correction circuit. Further, FIG. 9 of the accompanying drawings is a functional block diagram showing schematically a typical structure of the one-symbol differential detection circuit 1.

Figure 9:
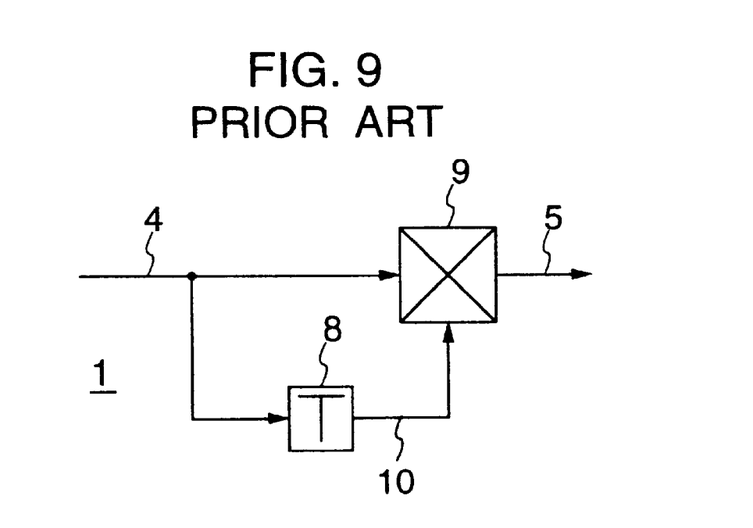
FIG. 9 is a schematic block diagram showing a typical structure of a one-symbol differential detection circuit in a conventional differential detector known heretofore.

In the differential detector with error correcting function implemented in such a configuration as shown in FIG. 8, the input signal 4 is inputted at first to the one-symbol differential detection circuit 1 to undergo phase comparison with the input signal preceding by one symbol (hereinafter also referred to as the one-symbol preceding input signal for convenience of the description), whereby a one-symbol differential detection signal 5 is obtained. In general, the one-symbol differential detection circuit 1 is composed of a delay circuit 8 for delaying the input signal 4 by one symbol and a digital multiplier 9, as shown in FIG. 9, wherein the one-symbol differential detection signal 5 can be derived by multiplying the current input signal 4 by the one-symbol preceding input signal.

Similarly, the input signal 4 is also inputted to the two-symbol differential detection circuit 2 to undergo phase comparison with the input signal preceding by two symbols (hereinafter also referred to as the two-symbol preceding input signal for convenience of the description), whereby a two-symbol differential detection signal 6 is obtained. In this conjunction, it should be mentioned that the two-symbol differential detection circuit 2 differs from the one-symbol differential detection circuit 1 in the respect that a delay circuit for delaying the input signal 4 by two symbols is provided in place of the delay circuit 8 designed for delaying the input signal 4 by one symbol and thus the two-symbol differential detection circuit 2 can be implemented in a circuit structure similar to that of the one-symbol differential detection circuit 1.

Finally, the one-symbol differential detection signal 5 and the two-symbol differential detection signal 6 are inputted to the error correction circuit 3, wherein the one-symbol differential detection signal 5 undergoes error correction processing, and thus an error-corrected differential detection output signal 7 is obtained, as can be seen from FIG. 8.

Figure 10:
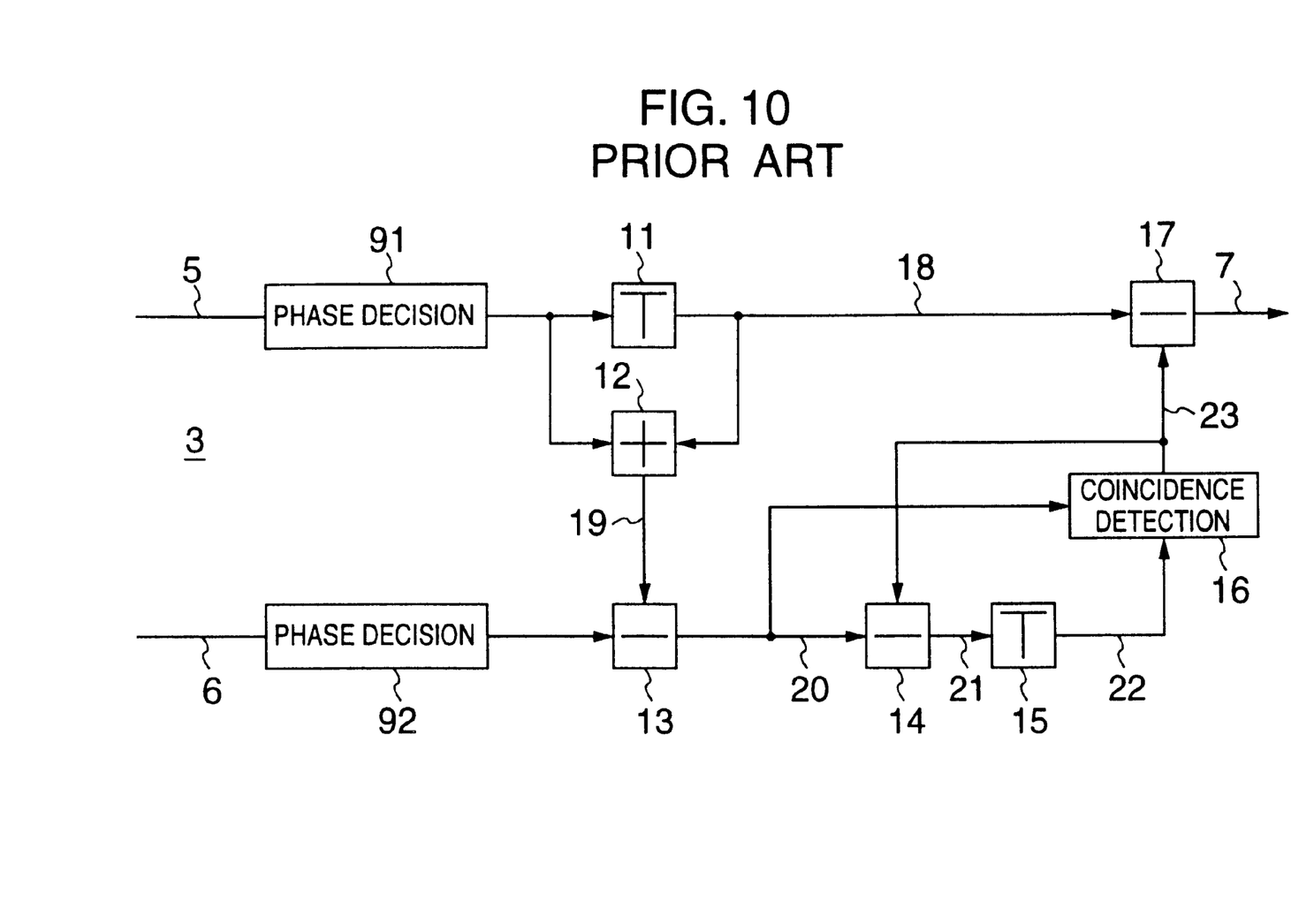
FIG. 10 is a schematic block diagram showing a typical structure of an error correction circuit in the conventional differential detector.

FIG. 10 of the accompanying drawings is a schematic circuit diagram showing a typical structure of the error correction circuit 3. In the figure, reference numerals 91 and 92 denote phase discrimination or decision circuits, respectively, numeral 12 denotes a digital adder, numerals 13, 14 and 17 denote digital subtractors, respectively, numerals 11 and 15 denote delay circuits, respectively, for delaying the input signal 4 by one symbol, and reference numeral 16 denotes a coincidence detection circuit.

Operation of the error correction circuit 3 will be described by reference to FIG. 10. In the first place, the phase of the one-symbol differential detection signal is discriminatively decided by means of the phase decision circuit 71, whereon the one-symbol differential detection signal 5 is delayed by one symbol by the delay circuit 11, whereby a delayed signal 18 is obtained. Representing by (n) the phase of the input signal 4, a phase difference signal $D_1(n)$ corresponding to the one-symbol differential detection signal 5 and a delayed phase difference signal $D_1(n-1)$ corresponding to the above-mentioned signal 18 can be given by the following expressions (1) and (2), respectively:

$$D\Phi_1(n)=\Phi(n)-\Phi(n-1) \quad (1)$$

$$D\Phi_1(n-1)=\Phi(n-1)-\Phi(n-2) \quad (2)$$

where n (=0, 1, 2 . . . ) indicate time points at which symbols make appearance, respectively.

Assuming that the one-symbol differential detection signal 5 contains error e(n), the above expression (2) can be rewritten as follows:

$$D\Phi_1(n-1)=\Phi(n-1)-\Phi(n-2)+e(n) \quad (3)$$

In succession, the one-symbol differential detection signal 5 and the delayed signal 18 are added together by means of the digital adder 12, whereby a signal 19 is obtained. This signal 19 can be given by the following expression (4):

$$D\Phi_1(n) + D\Phi_1(n-1) = \quad (4)$$
$$\{\Phi(n) - \Phi(n-1)\} + \{\Phi(n-1) - \Phi(n-2) + e(n)\} =$$
$$\Phi(n) - \Phi(n-2) + e(n)$$

On the other hand, a phase difference signal $D\Phi_2(n)$ corresponding to the two-symbol differential detection signal 6 is given by the undermentioned expression (5) on the presumption that no error is contained in the two-symbol differential detection signal 6.

$$D\Phi_2(n)=\Phi(n)-\Phi(n-2) \quad (5)$$

Subsequently, the two-symbol differential detection signal 6 having undergone the phase discrimination in the phase decision circuit 92 is subtracted from the signal 19 by means of the digital subtractor 13, as a result of which a signal s(n) corresponding to the output signal 20 of the digital subtractor 13 is obtained. The signal s(n) can be given by the following expression:

$$s(n)=\{\Phi(n)-\Phi(n-2)+e(n)\}-\{\Phi(n)-\Phi(n-2)\}=e(n) \quad (6)$$

Subsequently, a signal "error(n)" corresponding to an error pattern signal 23 is subtracted from the signal 20 by the digital subtractor 14, whereby a signal 21 which is free of influence of the error before one symbol is outputted from the digital subtractor 14 as a signal si(n). This signal si(n) is then delayed by one symbol by means of a delay circuit 15 whose output signal 22 is represented by si(n−1).

Now, the signals s(n) and si(n−1) corresponding to the signal 20 and the signal 22, respectively, are inputted to the coincidence detection circuit 16, whereby the signal "error (n)" is derived as the error pattern signal 23. The signal "error(n)" corresponding to the error pattern signal 23 is defined as follows:

$$\text{error}(n)=0 \text{ in case } s(n)=si(n-1) \text{ 0} \quad (7)$$

$$\text{error}(n)=0 \text{ in case } s(n)\neq 0 \text{ and } si(n-1)=0 \quad (8)$$

$$\text{error}(n)=0 \text{ in case } s(n)=0 \text{ and } si(n-1)\neq 0 \quad (9)$$

$$\text{error}(n)=m \text{ in case } s(n)=si(n-1)=m\neq 0 \quad (10)$$

Finally, the error pattern signal 23 is subtracted from the signal 18 by the digital subtractor 17, whereby the error-corrected differential detection output signal 7 can be obtained.

With the arrangement of the conventional differential detector equipped with the error correcting function described above, the error correction can be performed for the one-symbol differential detection signal so far as no error exists in the two-symbol differential detection signal. However, when the two-symbol differential detection signal suffers error, the error correction can not be carried out correctly for the one-symbol differential detection signal, but erroneous correction of error will be performed, giving rise to a problems that error becomes more serious due to erroneous correction, whereby the bit error rate characteristic is degraded rather than improved.

In this conjunction, there is disclosed in Japanese Unexamined Patent Application Publication No. 8908/1979 (JP-A-54-8908) a differential detection error correcting scheme based on the concept underlying the error correction code in conjunction with the detection scheme for an m-value digital carrier transmission system such as of an m-phase differential phase shift keying (DPSK) scheme or an m-value continuous phase frequency shift keying (CPFSK) scheme. According to the differential detection error correcting scheme mentioned above, error detection as well as error correction can be performed by making use of the inherent redundancy that the symbol contained in the data for transmission represents a modulo-m sum value of the information symbol contained in the time slot relevant to the above-mentioned symbol and the information symbol preceding by one time slot. However, when two or more of four elements constituting the syndromes si(n) and si(n−1) suffer error, the error detection as well as the error detection are rendered impossible as in the case of the conventional differential detector described previously.

SUMMARY OF THE INVENTION

In the light of the state of the art described above, it is an object of the present invention to provide a differential detector imparted with error correcting function for demodulating a differential phase-shifted signal, which detector is capable of correcting the error contained in the signal with enhanced effectivity, thus improving significantly the error rate characteristic.

In view of the above and other objects which will become apparent as the description proceeds, there is provided according to a general aspect of the present invention a differential detector imparted with error correcting function which is comprised of a first detection circuit for delaying an input signal substantially by one symbol period to obtain a first differential input signal for thereby generating a first detection signal corresponding to phase difference between the above-mentioned input signal and the first differential (or delayed) input signal, a second detection circuit for delaying the input signal substantially by two symbol periods to obtain a second differential (delayed) input signal for thereby generating a second detection signal corresponding to phase difference between the input signal and the second differential input signal, a third detection circuit for delaying the input signal substantially by four symbol periods to obtain a third differential input signal for thereby generating a third detection signal corresponding to phase difference between the input signal and the third differential (or delayed) input signal mentioned above, a first error correction circuit for performing error correction for the second detection signal by making use of the third detection signal, a delay circuit for delaying the first detection signal substantially by two symbol periods, and a second error correction circuit for performing error correction for the first detection signal outputted from the delay circuit by making use of the output signal of the first error correction unit.

By virtue of the arrangement in which the error correction for the second detection signal is performed by making use of the third detection signal while the error correction for the first detection signal is performed by making use of the second detection signal as corrected, there can be realized the differential detector which can effectively reduce error contained in the first detection signal with enhanced error correcting capability, whereby the error rate characteristic can significantly be improved.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings.
Embodiment 1

A first embodiment of the present invention relates to a differential detector imparted with error correcting function for correcting error contained in a two-symbol differential (or delayed) detection signal by making use of a four-symbol differential (or delayed) detection signal and then correcting error contained in a one-symbol differential (or delayed) detection signal by utilizing the corrected two-symbol differential detection signal.

Figure 1:
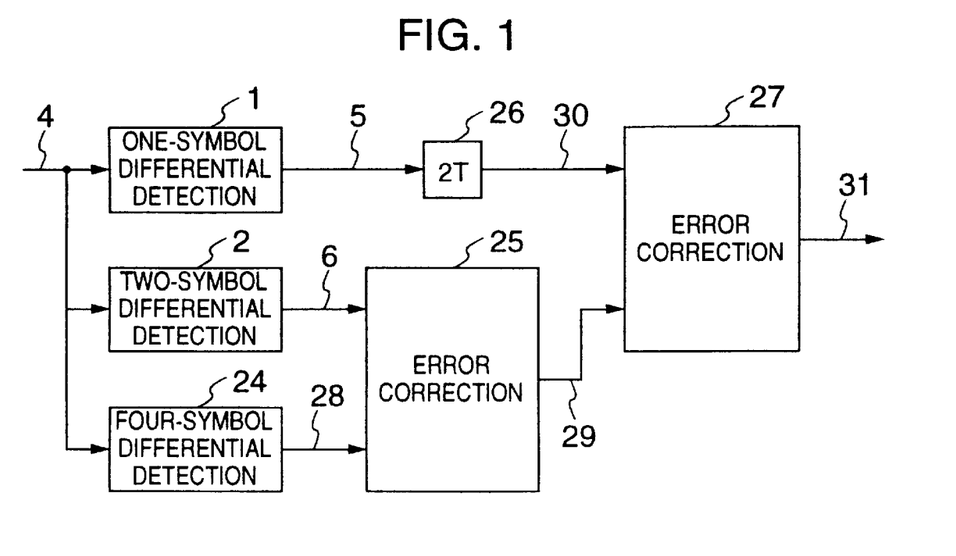
FIG. 1 is a functional block diagram showing schematically a structure of a differential detector equipped with an error correcting function according to a first embodiment of the present invention.
Figure 2:
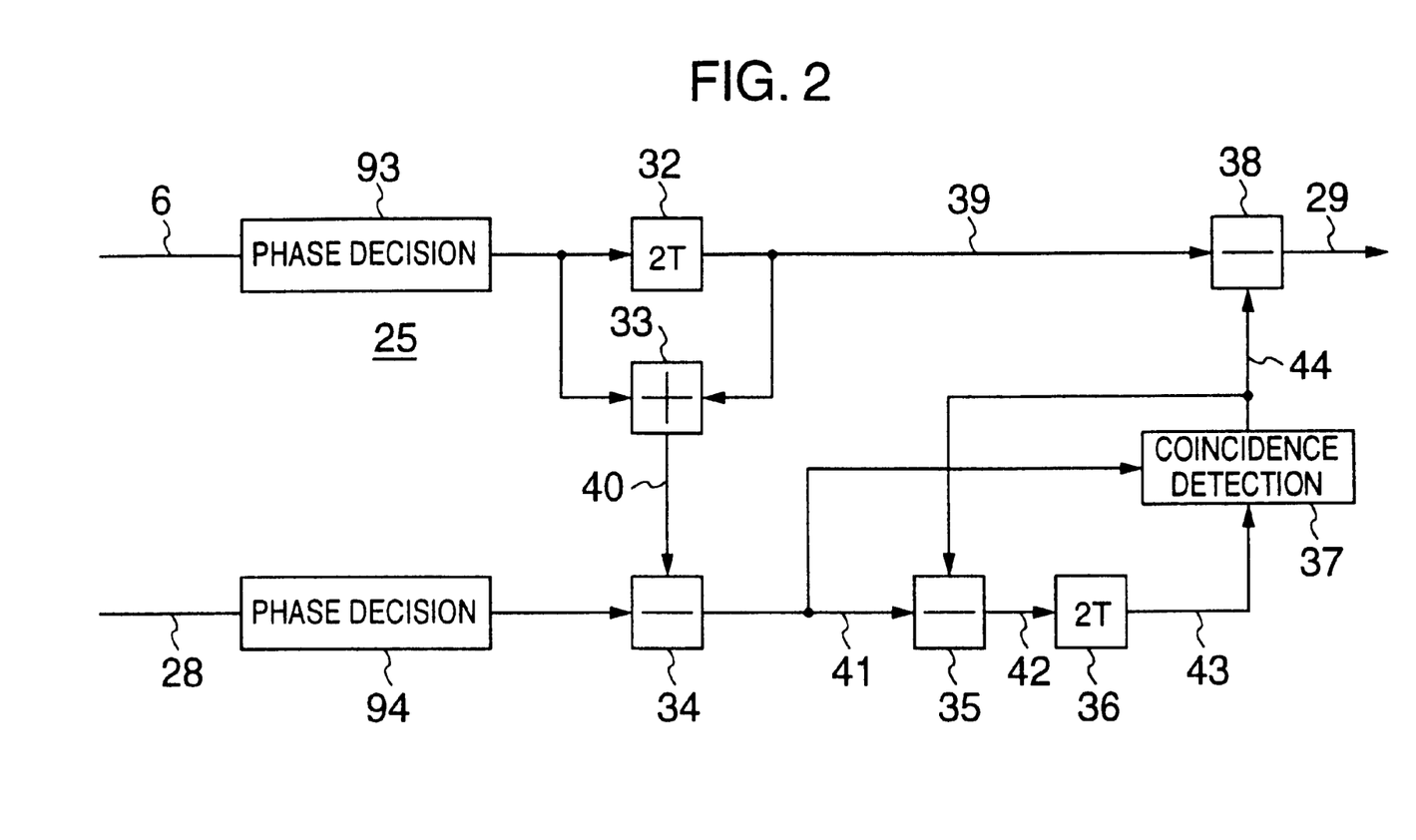
FIG. 2 is a functional block diagram showing an error correction circuit designed for performing error correction for a two-symbol differential detection signal in the differential detector according to the first embodiment of the invention.

Now, referring to FIGS. 1 and 2, description will be directed to the differential detector having the error correcting function according to the first embodiment of the invention, wherein FIG. 1 is a block diagram showing schematically a structure of the differential detector having the error correcting function. Referring to FIG. 1, a reference numeral 1 denotes a one-symbol differential detection circuit for performing phase comparison between a current input signal 4 and an input signal preceding by one symbol relative to the current input signal, numeral 2 denotes a two-symbol differential detection circuit for performing phase comparison between the current input signal 4 and an input signal preceding by two symbols relative to the current input signal, numeral 24 denotes a four-symbol differential detection circuit for performing phase comparison between the current input signal 4 and an input signal preceding by four symbols relative to the current input signal, and numerals 25 and 27 denote error correction circuits.

At first, the input signal 4 is inputted to the one-symbol differential detection circuit 1 to undergo phase comparison with the input signal preceding by one symbol (hereinafter referred to as the one-symbol preceding input signal for convenience of the description), whereby a one-symbol differential detection signal 5 which represents a phase difference between the input signal and the one-symbol preceding input signal is obtained. The one-symbol differential detection circuit 1 can be realized in such a structure as shown in FIG. 9. Similarly, the input signal 4 is inputted to the two-symbol differential detection circuit 2 and the four-symbol differential detection circuit 24, respectively, to undergo phase comparison with a two-symbol preceding input signal and a four-symbol preceding input signal, respectively, whereby a two-symbol differential detection signal 6 and a four-symbol differential detection signal 28 can be obtained, respectively. In this conjunction, it should be mentioned that the two-symbol differential detection circuit 2 differs from the one-symbol differential detection circuit 1 in the respect that the delay circuit for delaying the input signal 4 by two symbols (which is similar to the delay circuit 26) is provided in place of the delay circuit 8 designed for delaying the input signal 4 by one symbol. Thus, the two-symbol differential detection circuit 2 can be implemented in a circuit structure similar to that of the one-symbol differential detection circuit 1. Similarly, the four-symbol differential detection circuit 24 can be implemented in the circuit structure similar to that of the one-symbol differential detection circuit 1 except that a delay circuit for delaying the input signal 4 by our symbols is provided in place of the delay circuit 8 designed for delaying the input signal 4 by one symbol.

Next, the two-symbol differential detection signal 6 and the four-symbol differential detection signal 28 are inputted to the error correction circuit 25, wherein the two-symbol differential detection signal 6 undergoes error correction processing. Thus, an error corrected signal 29 can be derived from the correction of the two-symbol differential detection signal 6. The one-symbol differential detection signal 5 is delayed by two symbols through the delay circuit 26, whereby a signal 30 is obtained. Ultimately, the signals 30 and 29 are inputted to an error correction circuit 27, wherein the signal 30 undergoes error correction. In this way, an error-corrected differential detection output signal 31 can be obtained.

FIG. 2 is a schematic circuit diagram showing a typical structure of the error correction circuit 25 in the differential detector according to the first embodiment of the invention. Description will be made of the error correction circuit 25 by reference to FIG. 2. In this figure, numeral 33 denotes a digital adder, numerals 34, 35 and 38 denote digital subtractors, respectively, and reference numeral 32 and 36 denote delay circuits, respectively, for delaying the input signal 4 by two symbols, and numeral 37 denotes a coincidence detection circuit.

In the first place, the phase of the two-symbol differential detection signal 6 is discriminatively decided by a phase discrimination or decision circuit 93 to be subsequently delayed by two symbols by the delay circuit 32, whereby the signal 39 is obtained. Representing by $\Phi(n)$ the phase of the input signal 4, a phase difference signal $D\Phi_2(n)$ corresponding to the two-symbol differential detection signal 6 and a phase difference signal $D\Phi_2(n-2)$ corresponding to the signal 39 can be given by the following expressions (11) and (12), respectively.

$$D\Phi_2(n)=\Phi(n)-\Phi(n-2) \tag{11}$$

$$D\Phi_2(n-2)=\Phi(n-2)-\Phi(n-4) \tag{12}$$

where n (=0, 1, 2 ... ) indicate time points at which symbols make appearance, respectively.

Assuming that the signal 39 contains error $e(n)$, the above expression (12) can be rewritten as follows:

$$D\Phi_2(n-2)=\Phi(n-2)-\Phi(n-4)+e(n) \tag{13}$$

In succession, the two-symbol differential detection signal 6 and the signal 39 are added together by means of the digital adder 33, whereby a signal 40 is obtained. The signal 40 can be given by the following expression (14):

$$D\Phi_2(n) + D\Phi_2(n-2) = \{\Phi(n) - \Phi(n-2)\} + \{\Phi(n-2) - \Phi(n-4) + e(n)\} = \Phi(n) - \Phi(n-4) + e(n) \quad (14)$$

On the other hand, a phase difference signal $D\Phi_4(n)$ corresponding to the signal 28 can be given by the undermentioned expression (15) on the presumption that no error is contained.

$$D\Phi_4(n) = \Phi(n) - \Phi(n-4) \quad (15)$$

Subsequently, the four-symbol differential detection signal 28 having undergone the phase discrimination in the phase decision circuit 94 is subtracted from the signal 40 by the digital subtractor 34, as a result of which a signal s(n) corresponding to the output signal 41 of the digital subtractor 34 is obtained. The signal s(n) can be given by the following expression:

$$s(n) = \{\Phi(n) - \Phi(n-4) + e(n)\} - \{\Phi(n) - \Phi(n-4)\} = e(n) \quad (16)$$

In succession, a signal "error(n)" corresponding to an error pattern signal 44 is subtracted from the signal 41 by the digital subtractor 35, whereby a signal 42 which is free of the influence of error prevailing by two symbols before is outputted from the digital subtractor 35 as a signal si(n) which is then delayed by two symbols by means of a delay circuit 36, whose output signal 43 is represented by si(n−2).

The signals s(n) and si(n−2) corresponding to the signal 41 and the signal 43, respectively, are inputted to the coincidence detection circuit 37, whereby the abovementioned signal "error(n)" is derived as the error pattern signal 44. The signal "error(n)" corresponding to the error pattern signal 44 is defined as follows:

error(n)=0 in case s(n)=si(n−2)=0 (17)

error(n)=0 in case s(n)≠0 and si(n−2)=0 (18)

error(n)=0 in case s(n)=0 and si(n−2)≠0 (19)

error(n)=m in case s(n)=si(n−2)=m≠0 (20)

Finally, the error pattern signal 44 is subtracted from the signal 39 by the digital subtractor 38, whereby the two-symbol differential detection signal 29 undergone the error correction can be obtained.

Parenthetically, the error correction circuit 27 can be implemented in a substantially same structure as the one shown in FIG. 10 and serve for substantially same functions or operations as the latter.

As is apparent from the foregoing description, the differential detector with the error correcting function according to the first embodiment of the invention performs error correction of the two-symbol differential detection signal 6 by means of the error correction circuit 25 by making use of the four-symbol differential detection signal 28 and then performs error correction of the one-symbol differential detection signal 30 by means of the error correction circuit 27 by utilizing the corrected two-symbol differential detection signal 29, whereby error of the two-symbol differential detection signal 6 can be reduced with the error correcting capability for the one-symbol differential detection signal 5 being enhanced, which in turn is effective for improvement of the bit error rate characteristic.

Figure 3:
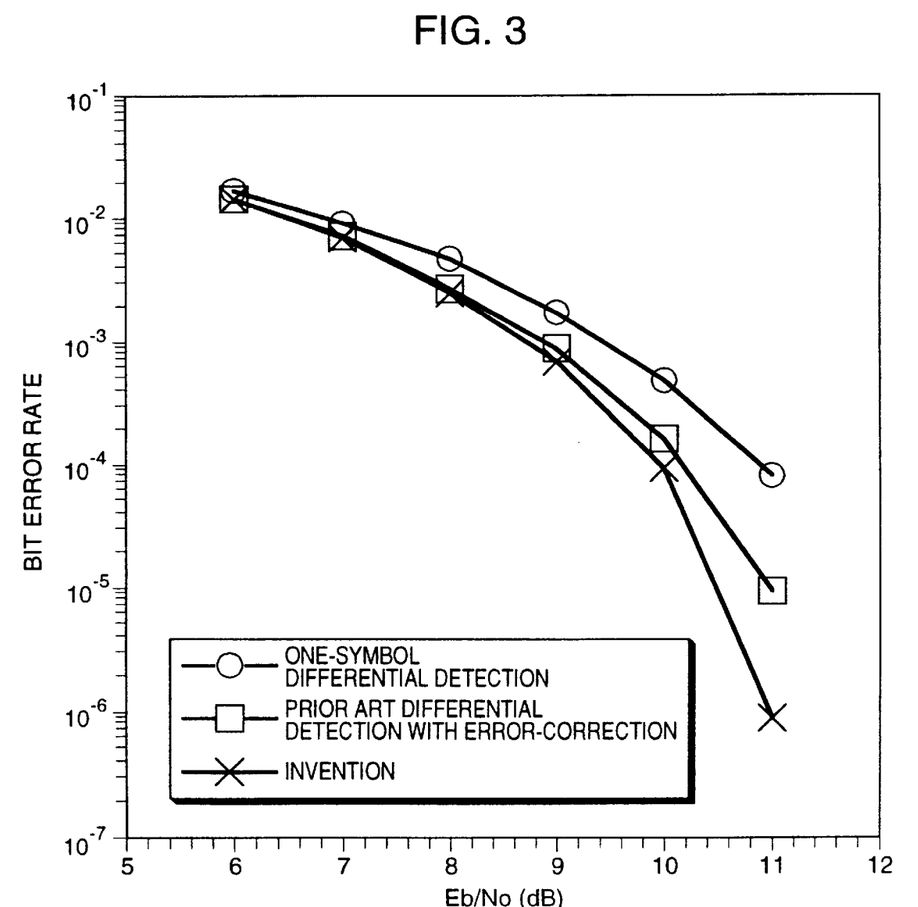
FIG. 3 is a view for graphically illustrating results of computer simulation of the differential detector according to the first embodiment of the invention.

FIG. 3 is a view for graphically illustrating Eb/No (a ratio of the received signal energy per bit to the noise density at a receiver) vs. bit error rate characteristics. In the figure, a curve affixed with circles "O" represents result of computer simulation in the case where only the one-symbol differential detector is used as the differential detector, while a curve with rectangular symbols "□" represents result of computer simulation of the differential detector in the case where no error correction is performed for the two-symbol differential detection signal. Further, a curve with "x" represents result of computer simulation performed for the differential detector with error correcting function according to the present invention. As can be seen from FIG. 3, according to the teachings of the invention incarnated in the first embodiment, the bit error rate can be improved by magnitude of two orders when compared with the differential detector where only the one-symbol differential detector is used as the differential detection circuit in case Eb/No=11 dB. Further, when compared with the case where no error correction is performed for the two-symbol differential detection signal, the bit error rate can be improved by magnitude of one order or so.

Embodiment 2

A second embodiment of the present invention will now be described. In the differential detector having the error correcting function according to the instant embodiment of the invention, a switch circuit is provided or discriminated for allowing the error correction of the one-symbol differential detection signal to be validated only when the decision-destined phase difference of the one-symbol differential detection signal exceeds a reference value.

Now, description will be made of the differential detector imparted with the error correcting function according to the second embodiment of the invention by reference to FIG. 4 which shows in a functional block diagram an error correction circuit designed for performing the error correction for the one-symbol differential detection signal in the differential detector according to the second embodiment. The circuit arrangement now under consideration differs from the one described hereinbefore in conjunction with the first embodiment in that a decision-destined phase difference signal generation circuit 45, a digital subtractor 46, a decision circuit 47 and a switch circuit 48 are additionally provided, wherein the error correction is performed for the one-symbol differential detection signal only when the decision-destined phase difference exceeds a reference value. Incidentally, components and signals in the instant embodiment which are same as or equivalent to those described hereinbefore in conjunction with the first embodiment are denoted by like reference characters, and repeated description thereof is omitted. Further, it should be mentioned that so far as the circuit arrangement for deriving the error pattern signal 23 is concerned, the second embodiment is substantially same as the first embodiment.

Figure 4:
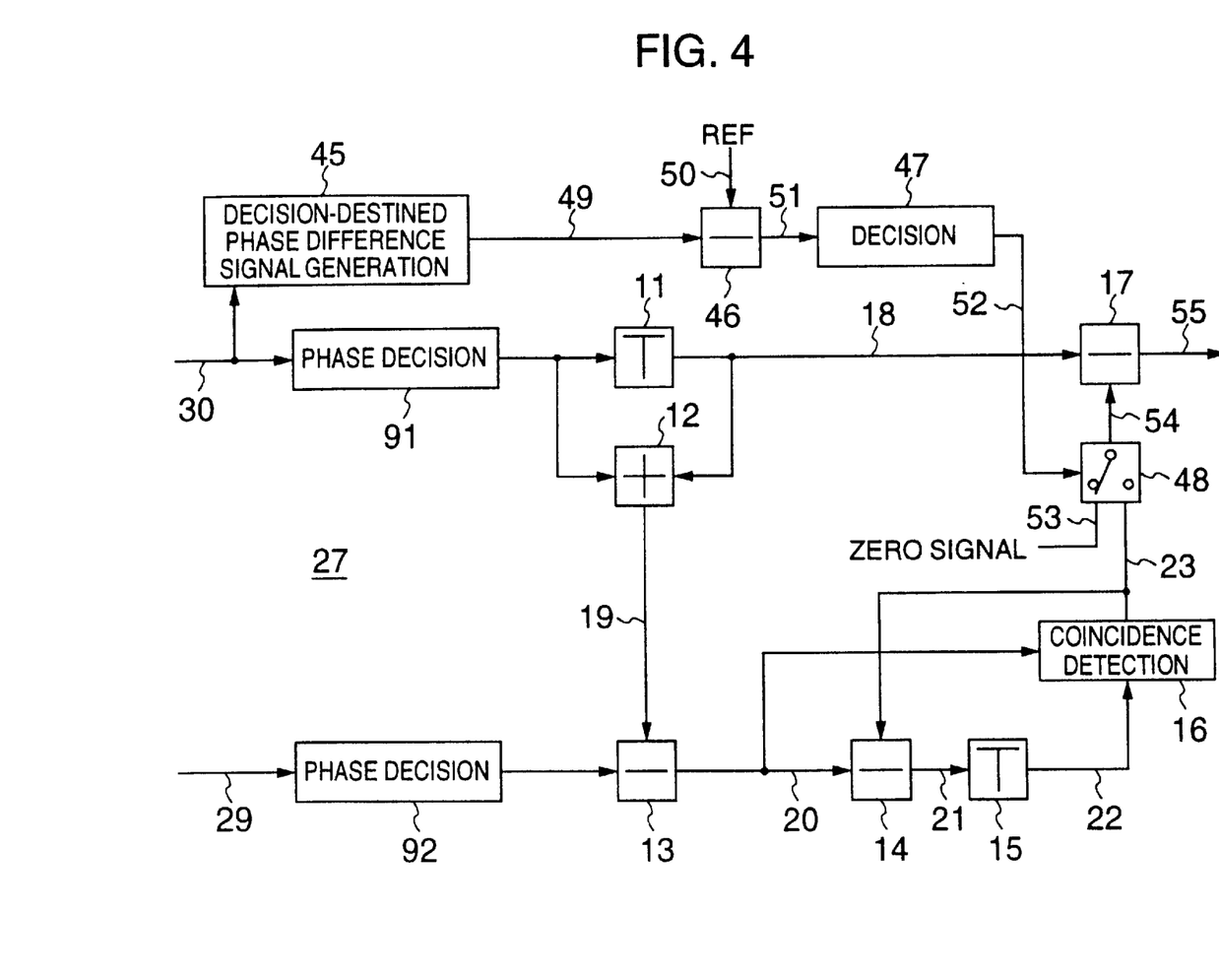
FIG. 4 is a functional block diagram showing an error correction circuit designed for performing error correction for a one-symbol differential detection signal in the differential detector according to a second embodiment of the invention.

Referring to FIG. 4, the signal 30 is a phase difference signal before undergoing the phase discrimination or decision. More specifically, the signal 30 undergoes phase discrimination or decision operation (hereinafter referred to as the phase decision) by the phase decision circuit 91, the output signal of which is then inputted to both the delay circuit 11 and the digital adder 12, respectively.

The signal 30 is supplied to the decision-destined phase difference signal generation circuit 45 as well, whereby a decision-destined phase difference signal 49 is outputted from the circuit 45. A reference signal (REF) 50 is subtracted from the decision-destined phase difference signal 49 by means of a digital subtractor 46 to thereby derive a signal 51 which is then inputted to the decision circuit 47. Thus, a control signal 52 is obtained as the output signal of the decision circuit 47. The switch circuit 48 is adapted to select either the error pattern signal 23 or a zero signal 53. The output signal of the error pattern signal 44 is shown as a signal 54. The signal 54 is subtracted from the signal 18 by means of the digital subtractor 17, whereby an error-corrected differential detection output signal 55 is obtained.

The decision-destined phase difference signal generation circuit 45 is so designed as to subtract from the signal 30 a signal resulting from the phase decision, wherein a signal resulting from the subtraction is outputted as the decision-destined phase difference signal 49. By way of example, in the $\pi/4$-DQPSK system, the center phase is $\pm\pi/4$ or $\pm 3\pi/4$. Consequently, threshold phase is zero, $\pm\pi/2$ or $\pm\pi$. Assuming now that the phase of the signal 30 is $0.4\pi$, the center phase is then $\pi/4$. Thus, the decision-destined phase difference signal 49 is of $0.15\pi$ ($=0.4\pi-0.25\pi$). Consequently, when the phase of the reference signal (REF) 50 is $1/8\pi$, the signal 51 meets the condition that $0.157\pi-0.125\pi=0.025\pi>0$. Since the decision-destined phase difference signal 49 exceeds the reference signal (REF) 50, the decision in the circuit 47 results in "positive or plus". Consequently, the switch circuit 48 is changed over to the position for validating the error correction in response to the control signal 52. Unless the decision-destined phase difference signal 49 exceeds the reference signal (REF) 50, the switch circuit 48 is changed over to the position for invalidating the error correction.

As will be appreciated from the above description, in the differential detector imparted with the error correcting function according to the second embodiment of the invention, the error correction is performed for the one-symbol differential detection signal only when the decision-destined phase difference of the one-symbol differential detection signal exceeds the reference value. In this conjunction, it is to be noted that the decision-destined phase difference being small indicates that the probability of error occurrence is small. In that case, if the error correction is performed, the probability of incurring erroneous correction will undesirably increase. With a view to evading such undesirable situation, the invention incarnated in the second embodiment teaches that the error correction for the one-symbol differential detection signal is performed only when the decision-destined phase difference is large, to thereby prevent the erroneous correction of the one-symbol differential detection signal when the decision-destined phase difference signal is of a small value. With this arrangement, the bit error rate characteristic can further be improved over the first embodiment of the invention.

Embodiment 3

A third embodiment of the present invention will now be described. In the differential detector imparted with the error correcting function according to the third embodiment of the invention, a switch circuit is provided for allowing the error correction of the two-symbol differential detection signal to be validated only when the decision-destined phase difference of the two-symbol differential detection signal exceeds a reference value.

Figure 5:
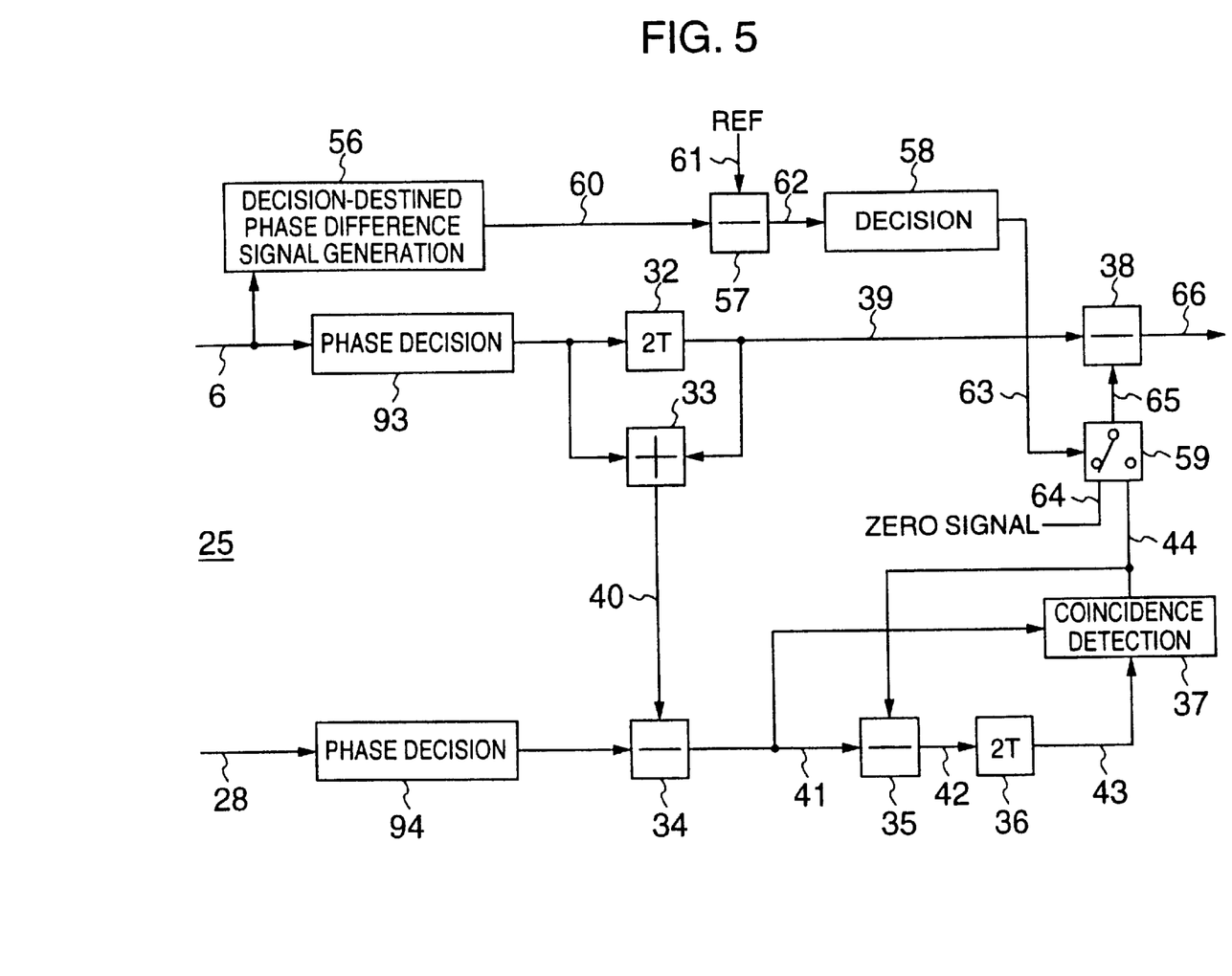
FIG. 5 is a functional block diagram showing an error correction circuit designed for performing error correction for a two-symbol differential detection signal in the differential detector according to a third embodiment of the invention.

Now, description will be made of the differential detector having the error correcting function according to the third embodiment of the invention by reference to FIG. 5 which is a functional block diagram showing an error correction circuit designed for performing the error correction for the two-symbol differential detection signal. The circuit arrangement now under consideration differs from the one described hereinbefore in conjunction with the first embodiment in that a decision-destined phase difference signal generation circuit 56, a digital subtractor 57, a decision circuit 58 and a switch circuit 59 are additionally provided, wherein the error correction is performed for the two-symbol differential detection signal only when the decision-destined phase difference signal has a value which exceeds a reference value. Incidentally, components and signals in the instant embodiment same as or equivalent to those described hereinbefore in conjunction with the third embodiment are denoted by like reference characters, and repeated description thereof is omitted. Further, the process carried out up to the generation of the error pattern signal 44 is same as that in the case of the second embodiment.

The two-symbol differential detection signal 6 is supplied to the decision-destined phase difference signal generation circuit 56 as well, whereby a decision-destined phase difference signal 60 is outputted from the circuit 56. A reference signal (REF) 61 is subtracted from the decision-destined phase difference signal 60 by the digital subtractor 57 to thereby derive a signal 62 which is then inputted to the decision circuit 58. Thus, the control signal 63 is obtained as the output signal of the decision circuit 58. The switch circuit 59 is adapted to select either the error pattern signal 44 or a zero signal 64. The output signal of the error pattern signal 44 is shown as a signal 65. The signal 65 is subtracted from the signal 39 by means of the digital subtractor 38, whereby an error-corrected differential detection output signal 66 is obtained. The remaining process carried out up to the generation of the error-corrected differential detection output signal 55 is same as in the case of the first embodiment.

The two-symbol differential detection signal 6 represents a phase difference signal. The decision-destined phase difference signal generation circuit 56 subtracts the center phase from the phase difference signal to thereby output a decision-destined phase difference signal 60. When the decision-destined phase difference signal is of a small value, it is then decided that no error exists. In this case, no error correction is carried out. On the other hand, when the decision-destined phase difference signal is of a large value, being close to the threshold value, this means that the probability of error occurrence is large. Accordingly, error correction is performed.

As will be appreciated from the above description, in the differential detector having the error correcting function according to the third embodiment of the invention, the error correction is performed for the two-symbol differential detection signal only when the decision-destined phase difference of the two-symbol differential detection signal exceeds the reference value. In this way, by preventing the erroneous correction of the two-symbol differential detection signal when the decision-destined phase difference is small, the bit error rate characteristic can further be improved over the first embodiment of the invention.

Embodiment 4

A fourth embodiment of the invention is directed to a differential detector having error correcting function in which an arrangement for making variable the reference value to be compared with the decision-destined phase difference is provided in association with the error correction circuit which performs error correction for the one-symbol differential detection signal.

Figure 6:
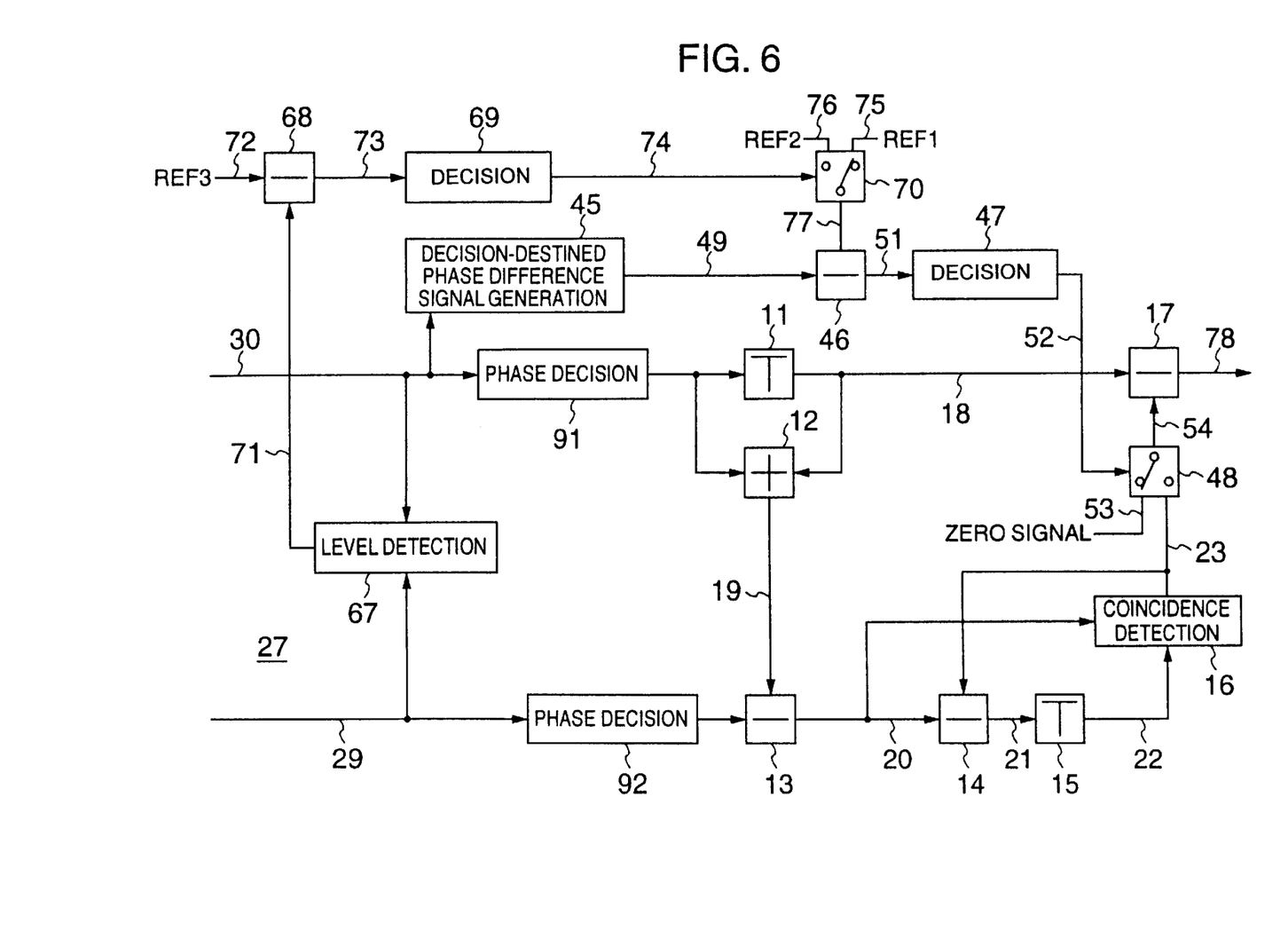
FIG. 6 is a functional block diagram showing an error correction circuit designed for performing error correction for a one-symbol differential detection signal in the differential detector according to a fourth embodiment of the invention.

Now, description will be made of the differential detector having the error correcting function according to the fourth embodiment of the invention by reference to FIG. 6 which shows in a functional block diagram an error correction circuit designed for performing the error correction for the one-symbol differential detection signal. The circuit arrangement now under consideration differs from the one described hereinbefore in conjunction with the second embodiment in that a level detection circuit 67, a digital subtractor 68, a decision circuit 69 and a switch circuit 70 are additionally provided in the differential detector having the error correcting function for the one-symbol differential detection signal, wherein the reference value compared with the decision-destined phase difference is adapted to be variable. Incidentally, components and signals same as or equivalent to those described hereinbefore in conjunction with the second embodiment are denoted by like reference characters, and repeated description thereof is omitted. Further, the process carried out up to the generation of the decision-destined phase difference signal 49 is same as in the case of the second embodiment.

The signal 30 and the corrected two-symbol differential detection signal 29 are inputted to the level detection circuit 67 for detecting an input signal level and a noise level, respectively, to derive a signal 71 indicating the input signal level relative to the noise level. Each of the signal 30 and the corrected two-symbol differential detection signal 29 represents a phase difference signal. Difference between the phase difference signal and the center phase as detected by the level detection circuit 67 can be regarded as representing magnitude of noise. Accordingly, by integrating the difference mentioned above over a period of appropriate duration, the noise level can be determined.

Subsequently, the reference signal 72 is subtracted from the signal 71 by means of the digital subtractor 68, whereby a signal 73 is derived. The signal 73 then undergoes decision processing by the decision circuit 69, as a result of which a control signal 74 is obtained. This control signal 74 serves for controlling the switch circuit 70 which selects either the reference signal 75 or 76. The output signal of the switch circuit 70 is designated by numeral 77. Incidentally, the succeeding process carried out up to the generation of the error-corrected differential detection output signal 78 is same as in the case of the second embodiment.

In general, as the signal-to-noise power ratio increases, the probability of the decision-destined phase difference of the input signal becomes high when error takes place. In this conjunction, it is however noted that when the noise level is high, the probability of error occurrence due to the noise increases. Accordingly, even when the phase difference signal is closer to the center phase (being remote from the threshold phase) with the decision-destined phase difference being small, there is a possibility that error is generated due to the noise of large magnitude. Such being the circumstances, it is preferred to set wide ranges for the error correction at both sides of the threshold level. By contrast, when the noise level is low, the probability of error occurrence due to noise is low, which in turn means that the probability of error is low when the decision-destined phase difference is small. For these reasons, possibility of the erroneous correction can be suppressed by regarding that occurrence of error is limited to the vicinity of the threshold phase.

Thus, by increasing the reference value for comparison with the decision-destined phase difference as the signal-to-noise power ratio increases, the erroneous correction can be prevented more positively. To say in another way, the error rate on the whole can be lowered by performing the error correction even when the decision-destined phase difference is small provided that the noise level is high, while when the noise level is low, the error correction is validated only if the decision-destined phase difference is sufficiently large.

As is apparent from the above description, in the differential detector with the error correcting function according to the fourth embodiment of the invention, the level detection circuit 67, the digital subtractor 68, the decision circuit 69 and the switch circuit 70 are provided in the error correction circuit for performing the error correction for the one-symbol differential detection signal, wherein the reference value to be compared with the decision-destined phase difference is so designed as to be made variable. By increasing the reference value for the error correction when the noise level is low, the erroneous correction can be excluded more positively when compared with the differential detector having the error correcting function according to the second embodiment of the invention.

Embodiment 5

A fifth embodiment of the invention is directed to a differential detector having the error correcting function in which an arrangement for making variable the reference value to be compared with the decision-destined phase difference is provided in association with the error correction circuit which performs error correction for the two-symbol differential detection signal.

Figure 7:
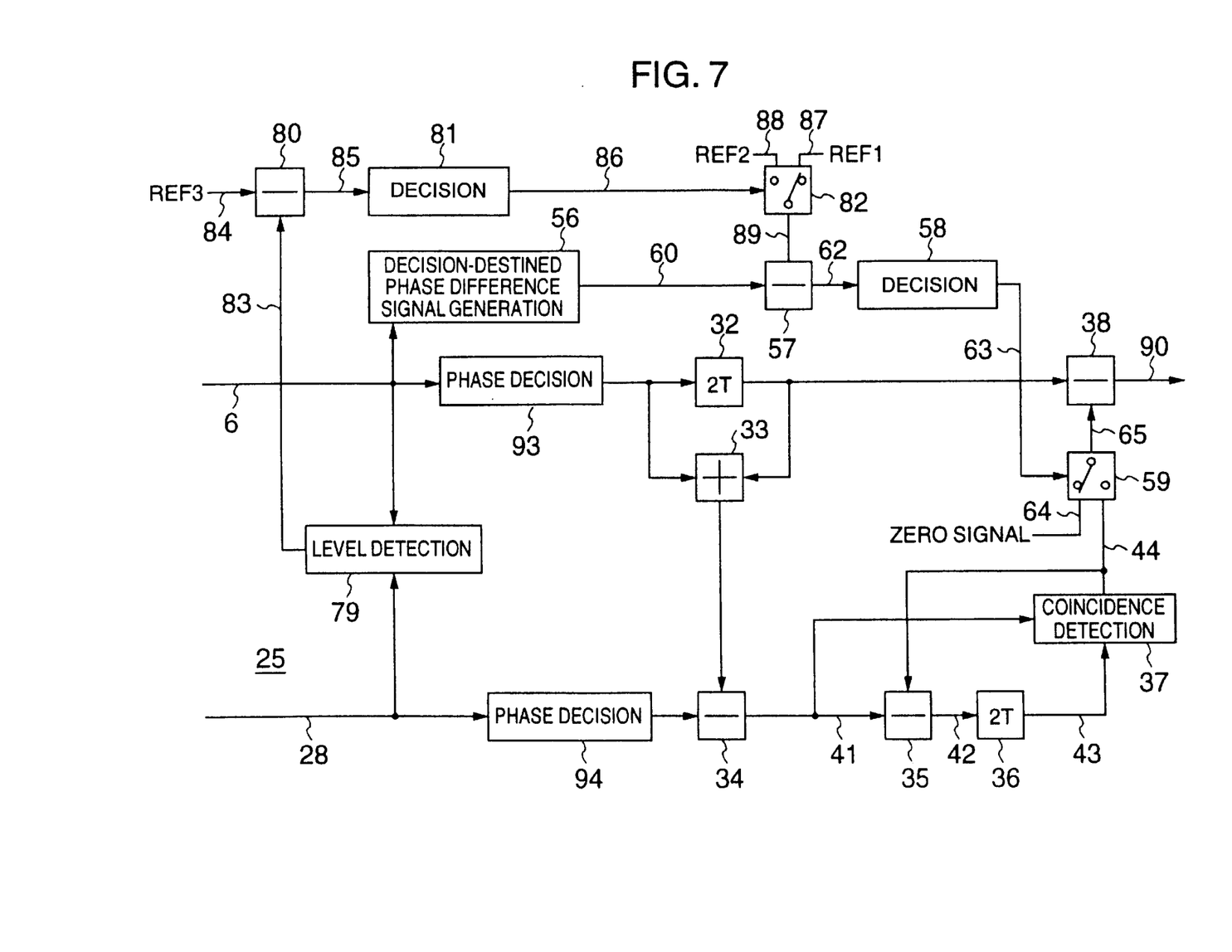
FIG. 7 is a functional block diagram showing an error correction circuit designed for performing error correction for a two-symbol differential detection signal in the differential detector according to a fifth embodiment of the present invention.

Now, description will be made of the differential detector having the error correcting function according to the fifth embodiment of the invention by reference to FIG. 7 which shows in a functional block diagram an error correction circuit designed for performing the error correction for the two-symbol differential detection signal. The circuit arrangement now under consideration differs from the one described hereinbefore in conjunction with the third embodiment in that a level detection circuit 79, a digital subtractor 80, a decision circuit 81 and a switch circuit 82 are additionally provided in the error correction circuit which performs error correction for the two-symbol differential detection signal, wherein the reference value for comparison with the decision-destined phase difference is adapted to be variable. Incidentally, components and signals same as or equivalent to those described hereinbefore in conjunction with the third embodiment are denoted by like reference characters, and repeated description thereof is-omitted. Further, the process carried out up to the generation of the decision-destined phase difference signal 60 is substantially same as in the case of the third embodiment.

The two-symbol differential detection signal 6 and the four-symbol differential detection signal 28 are inputted to the level detection circuit 79 for detecting an input signal level and a noise level, respectively, to thereby derive a signal 83 indicating the input signal level relative to the noise level. Subsequently, the level signal 83 is subtracted from the reference signal 84 by the digital subtractor 80, whereby a signal 85 is derived. The signal 85 then undergoes decision processing by the decision circuit 81, as a result of which a control signal 86 is obtained. This control signal 86 serves for controlling the switch circuit 82 which selects either the reference signal 87 or 88 to output a signal 89. When the noise level is high, the reference signal 89 for comparison with the decision-destined phase difference signal 60 is set low for thereby allowing the error correction of the two-symbol differential detection signal to be performed within a wide or broad range, while when the noise level is low, the reference signal for comparison with the decision-destined phase difference signal is set high for thereby allowing the error correction of the two-symbol differential detection signal to be performed within a narrow range. The succeeding process carried out up to the generation of the error-corrected differential detection output signal 90 is same as in the case of the second embodiment.

As is apparent from the above description, in the differential detector having the error correcting function according to the fifth embodiment of the invention, the level detection circuit 79, the digital subtractor 80, the decision circuit 81 and the switch circuit 82 are provided in the error correction circuit performing error correction for the two-symbol differential detection signal, wherein the reference value to be compared with the decision-destined phase difference is made variable. By increasing the reference value for enabling the erroneous correction when the noise level is low, the error correction can be excluded more positively when compared with the differential detector having the error correcting function according to the third embodiment of the invention.

As is apparent from the foregoing description, the present invention teaches that the error correction is performed for the two-symbol differential detection signal by making use of the four-symbol differential detection signal and then performing the error correction for the one-symbol differential detection signal by utilizing the corrected two-symbol differential detection signal. Thus, the erroneous correction due to the error contained in the two-symbol differential detection signal can be prevented, whereby the bit error rate characteristic can be improved Further, by performing no error correction when the decision-destined phase difference is small while enabling the error correction only when the decision-destined phase difference is large, the error correction can be disabled when the decision-destined phase difference signal is of small magnitude, whereby the bit error rate characteristic can further be improved.

Furthermore, by performing the error correction over a wide range when the noise level is high while carrying out the error correction within a narrow range when the noise level is low, erroneous correction can be prevented when the noise level is low, whereby the bit error rate characteristic can be improved more significantly.

What is claimed is:

1. A differential detector imparted with error correcting function, comprising:

first detecting means for delaying an input signal substantially by one symbol period to obtain a first differential input signal for thereby generating a first detection signal corresponding to a phase difference between said input signal and said first differential input signal;

second detecting means for delaying said input signal substantially by two symbol periods to obtain a second differential input signal for thereby generating a second detection signal corresponding to a phase difference between said input signal and said second differential input signal;

third detecting means for delaying said input signal substantially by four symbol periods to obtain a third differential input signal for thereby generating a third detection signal corresponding to a phase difference between said input signal and said third differential input signal;

first error correcting means for carrying out error correction for said second detection signal by making use of said third detection signal;

delay means for delaying said first detection signal substantially by two symbol periods; and second error correction means for carrying out error correction for said first detection signal outputted from said delay means by making use of an output signal of said first error correction means.

2. A differential detector according to claim 1, wherein said first error correcting means includes:

a first delay circuit for delaying said second detection signal substantially by two symbol periods;

an adder for adding together said second detection signal and an output signal of said first delay circuit;

a first subtractor for subtracting said third detection signal from an output signal of said adder;

a second subtractor for subtracting an error pattern signal from the output signal of said first subtractor;

a second delay circuit for delaying an output signal of said second subtractor substantially by two symbol periods;

a coincidence detection circuit for comparing the output signal of said first subtractor and the output signal of said second delay circuit with each other to thereby generate said error pattern signal in accordance with a result of said comparison; and a third subtractor for subtracting said error pattern signal from the output signal of said first delay circuit.

3. A differential detector according to claim 1, wherein said second error correcting means includes:

a first delay circuit for delaying said first detection signal outputted from said delay circuit substantially by one symbol period;

an adder for adding together said first detection signal outputted from said delay circuit and an output signal of said first delay circuit;

a first subtractor for subtracting said second detection signal from an output signal of said adder;

a second subtractor for subtracting an error pattern signal from the output signal of said first subtractor;

a second delay circuit for delaying an output signal of said second subtractor substantially by one symbol period;

a coincidence detection circuit for comparing the output signal of said first subtractor and the output signal of said second delay circuit with each other to thereby generate said error pattern signal in accordance with a result of said comparison; and a third subtractor for subtracting said error pattern signal from the output signal of said first delay circuit.

4. A differential detector according to claim 1, further comprising:

decision means for making a decision as to whether data contained in said second detection signal is correct or erroneous; and selecting means for selectively deciding whether or not error correction is to be validated for said second detection signal on the basis of a result of the decision made by said decision means.

5. A differential detector according to claim 1, further comprising:

decision means for making a decision as to whether data contained in said first detection signal is correct or erroneous; and selecting means for selectively deciding whether or not error correction is to be validated for said first detection signal on the basis of a result of the decision made by said decision means.

6. A differential detector according to claim 4, wherein:

said decision means is so arranged as to generate a decision difference signal indicating whether data contained in said second detection signal is correct or erroneous for thereby comparing said decision difference signal with a reference value to make a decision as to whether the data carried by said second detection signal is correct or erroneous; and said differential detector further comprising means for detecting a signal level and a noise level of said second detection signal for thereby outputting said reference value as a variable value on the basis of said signal level and said noise level as detected.

7. A differential detector according to claim 5, wherein:

said decision means is so arranged as to generate a decision difference signal indicating whether data contained in said first detection signal is correct or erroneous for thereby comparing said decision difference signal with a reference value to make a decision as to whether the data carried by said first detection signal is correct or erroneous; and said differential detector further comprising means for detecting a signal level and a noise level of said first detection signal for thereby outputting said reference value as a variable value on the basis of said signal level and said noise level as detected.

\* \* \* \* \*